(No Model.)

T. P. WILKINSON.
MACHINE FOR MOLDING HATS.

No. 401,809. Patented Apr. 23, 1889.

Witnesses.
Fred. L. Greenleaf
Maurice L. Emery

Inventor.
Thomas P. Wilkinson,
By Crosby & Gregory
Attys

UNITED STATES PATENT OFFICE.

THOMAS P. WILKINSON, OF MILFORD, MASSACHUSETTS.

MACHINE FOR MOLDING HATS.

SPECIFICATION forming part of Letters Patent No. 401,809, dated April 23, 1889.

Application filed January 31, 1889. Serial No. 298,204. (No model.)

*To all whom it may concern:*

Be it known that I, THOMAS P. WILKINSON, of Milford, county of Worcester, State of Massachusetts, have invented an Improvement in Machines for Molding Hats, of which the following description, in connection with the accompanying drawings, is a specification, like letters on the drawings representing like parts.

This invention has for its object to construct a machine for molding hats, it being especially designed for molding or pressing straw hats into proper shape.

The invention consists in the combination, with a holder chambered to receive steam and an outer mold comprising the crown and an independent brim, of an inner mold and support therefor, said inner and outer molds being movable one with relation to the other. The outer mold is preferably held stationary and steam or hot air is admitted to its chambered holder, and the inner mold is supported on a vertically-movable bed-plate. Means are provided for moving said mold-support or bed-plate a definite distance, and thereafter moving it still farther, if desired. The chambered holder is provided with fastenings (herein represented as set-screws) for holding a crown-mold in position, it being understood that crown-molds of many shapes and sizes are necessarily employed with each machine, the crown-molds being so shaped as to receive and support a brim-mold of any desired width. It frequently happens that a single brim-mold may be employed in connection with many different crown-molds, and vice versa; hence the reason for making them independent.

Figure 1:
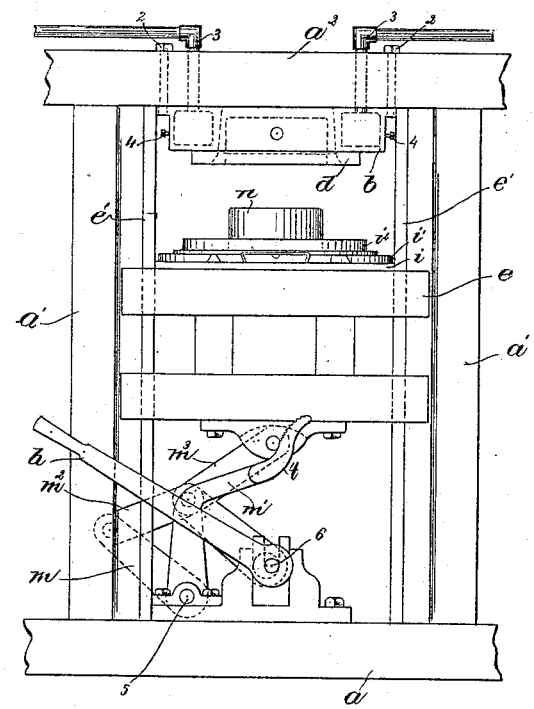
Figure 2:
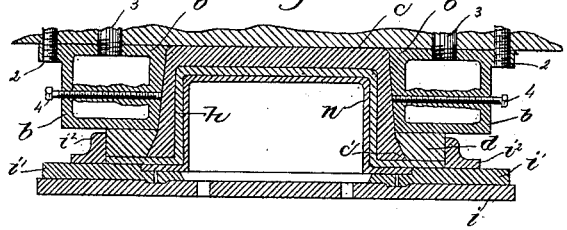

Figure 1 shows in front elevation a hat-pressing machine embodying this invention; Fig. 2, a vertical section of the molds and their supports closed or forced together with the hat between.

The base $a$, side supports, $a'$, and cross-bar $a^2$ are of any suitable construction. A hollow or chambered holder or support, $b$, is secured to the cross-bar $a^2$ by bolts and nuts 2 or otherwise. Pipes 3 lead to the hollow or chambered holder $b$, which conduct steam or hot air thereto. An outer crown-mold, $c$, (see Fig. 2,) is held in position in the holder $b$ by set-screws 4, said crown-mold being shaped interiorly for the desired contour of the hat. The mold $c$ has at its lower edge a projection or rib, $c'$, having an inclined or beveled face to support the brim-mold $d$, it having an inclined or beveled inner face to rest upon or co-operate with the said rib $c'$ and be held in place or supported by it. The bed-plate or support $e$, arranged to slide on the vertical guide-rods $e'$, has secured to it a plate, $i$, upon which is placed or secured a plate, $i'$, and above it a guide or rim, $i^2$, of a size to fit the brim-model $d$. The inner mold, $n$, exteriorly shaped to conform to the interior contour of a hat, is detachably secured to the plate $i'$. Two parallel bars or levers, $m$ $m'$, are pivoted, respectively, at 5 6, being joined at the ends opposite the pivots by a link, $m^2$, and a link, $m^3$, is loosely connected with the support $e$, and with the said parallel bars or levers forming a toggle-joint connection. A bent treadle-bar, $t$, is secured to the pivot 5, by which the said toggle is operated to raise the support $e$ a definite distance. A hand-lever, $h$, is secured eccentrically to the pivot 6, so that when moved it may effect a further vertical movement of the support $e$. I however do not desire to limit my invention to any particular construction of mechanism for raising the support $e$, and I would further add that I do not desire to limit my invention to any particular means of securing the several parts in their respective positions.

If it be desired to press hats of different width of brim, a brim-mold of the proper width will be applied to the mold $c$, and a ring, $i^2$, having an opening of the size of the brim-mold, will be applied to the plate $i'$.

When the sizes of the corners of the hats to be pressed vary, the molds $c$ and $n$ will be changed to suit.

A brim-mold of any desired width may be readily applied to the mold $c$.

In Fig. 2, $h$ shows the hat being pressed.

I claim—

1. In a machine for pressing hats, an outer crown-mold and an independent brim-mold, and the hollowed or chambered holder therefor, combined with the removable inner crown-mold support therefor, and the independent rim or guide $i^2$, and means, substantially as described, for moving vertically the said support, as set forth.

2. In a machine for pressing hats, the outer crown-mold and independent brim-mold, the support or holder therefor, and fastenings, as set-screws, for securing the said outer crown-mold in position, combined with the inner crown-mold and vertically-movable support therefor, substantially as described.

3. In a machine for pressing hats, the outer crown-mold and independent brim-mold, the support or holder therefor, combined with the inner crown-mold, the rim or guide $i^2$, and support for said mold and rim or guide, substantially as described.

In testimony whereof I have signed my name to this specification in the presence of subscribing witnesses.

THOMAS P. WILKINSON.

Witnesses:
P. P. FIELD,
J. H. MATTHEWS,
FREDERICK L. EMERY.